(12) United States Patent
Khoshnevis

(10) Patent No.: US 8,618,680 B2
(45) Date of Patent: Dec. 31, 2013

(54) SPACED-APART CABLE MODULES IN WELLBORE ENERGY STORAGE AND RETRIEVAL

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 234 days.

(21) Appl. No.: 13/076,255

(22) Filed: Mar. 30, 2011

(65) Prior Publication Data
US 2011/0241356 A1 Oct. 6, 2011

Related U.S. Application Data

(60) Provisional application No. 61/319,701, filed on Mar. 31, 2010.

(51) Int. Cl.
*F02B 63/04* (2006.01)
*F03G 7/08* (2006.01)
*H02K 7/18* (2006.01)

(52) U.S. Cl.
USPC ...................................................... 290/1 R

(58) Field of Classification Search
USPC ......... 290/1 R, 42, 43; 254/264, 385; 60/398, 60/495, 496, 698; 417/328, 331, 333, 337; 405/76; 174/102, 106, 120 SR, 128.1, 174/135
See application file for complete search history.

(56) References Cited

U.S. PATENT DOCUMENTS

| 4,380,180 | A | 4/1983 | Foote et al. |
| 5,353,777 | A | 10/1994 | Fincher |
| 2005/0188783 | A1 | 9/2005 | Stanimirovic |
| 2011/0241354 | A1 | 10/2011 | Khoshnevis et al. |

FOREIGN PATENT DOCUMENTS

| JP | 56-034981 A1 | 4/1981 |
| WO | 2011/123634 A2 | 10/2011 |

OTHER PUBLICATIONS

Mechanical Electric, Inc. Company web site obtained via WayBack Machine, for May 16, 2010, downloaded Sep. 6, 2011, from http://web.archive.org/web/20100516124406/http://mechanicalelectric.com. (11 pages).
International Search Report and Written Opinion of the International Searching Authority, dated Nov. 17, 2011, for PCT Application No. PCT/US2011/030711, filed Mar. 31, 2011, entitled "Multi-Segment Weight and Spaced-Apart Cable Modules in Wellbore Energy Storage and Retrieval" (Published as WO 2011/123634 A2, Oct. 6, 2011).
Gravitational Potential Energy Storage—Seeking Comments. 2007. In Physics Forums, Mechanical Engineering, Online Forum, started Apr. 20, 2007, last comment Jul. 27, 2009. Downloaded Feb. 8, 2011 at www.physicsforums.com/showthread.php?t=166679.

*Primary Examiner* — Tulsidas C Patel
*Assistant Examiner* — Thomas Quigley
(74) *Attorney, Agent, or Firm* — McDermott Will & Emery LLP

(57) ABSTRACT

A system for storing and retrieving energy may include a cable and a weight connected to the cable. A plurality of cable modules may be attached at spaced-apart locations to the cable above the weight. Each cable module may prevent the cable above and below the cable module from coming in contact with a neighboring stationary wall. A hoist may controllably raise and lower the weight by sequentially grabbing each neighboring cable module.

20 Claims, 11 Drawing Sheets

SPACED-APART CABLE MODULES IN WELLBORE ENERGY STORAGE AND RETRIEVAL

CROSS-REFERENCE TO RELATED APPLICATION

This application is based upon and claims priority to U.S. provisional patent application No. 61/319,701, entitled "USE OF DEPLETED, ABANDONED, OR OPERATIONAL WELLBORES FOR ENERGY STORAGE USING SUSPENDED MASS," filed Mar. 31, 2010.

This application is also related to co-pending application Ser. No. 13/076,247 filed on the same day as this application and with the same named inventor, priority claim, and assignee, entitled "Multi-Segment Weight In Wellbore Energy Storage And Retrieval".

The entire content of both of these applications is incorporated herein by reference.

BACKGROUND

1. Technical Field

This disclosure relates to wellbore systems that utilize a suspended weight to store and retrieve energy.

2. Description of Related Art

Electric storage is becoming more critical as electric grids increasingly use variable sources of electrical energy, such as sunlight, wind, and ocean waves. The variable nature of these sources may force electric utilities to maintain backup fossil-fuel burning sources to provide power when the variable sources suddenly drop in energy output. Rapidly responding energy storage systems may replace these backup sources, which may provide economic benefit to the utilities and also reduce the consumption of fossil fuels and the concomitant emission of harmful gases into the atmosphere.

Batteries and capacitors have commonly been used to store electrical energy. However, adapting these technologies to a large electric grid, such as one that supplies an entire city, can be challenging. Batteries can be expensive and their production and disposal may have undesirable environmental impacts. Capacitors may be used for power conditioning, but may not be affordable for storage of large quantities of energy, and may not retain stored energy for useful periods of time.

Excess energy from electrical sources may be stored almost indefinitely as gravitational potential energy using a weight suspended by a cable and then retrieved when needed. The excess energy may drive a motor that raises the weight by pulling on the cable. The weight may later be allowed to descend as the lengthening cable drives a generator. This returns energy that was stored due to the increased height of the weight. Energy stored in this way may be used advantageously by the operator of an electric grid in applications known as output leveling, load leveling, peak shaving, voltage support, and emergency stored energy.

It may be convenient to move the weight up and down within a wellbore. Unfortunately, wellbores are often not straight. This can cause the cable to scrape against the wall of the wellbore as the weight is raised and lowered. This may damage both the cable and the wall of the wellbore and waste energy.

There may also be challenges in raising and lowering the weight without slippage between the cable and the mechanism that hoists it.

SUMMARY

A system for storing and retrieving energy may include a cable and a weight connected to the cable. A plurality of cable modules may be attached at spaced-apart locations to the cable above the weight. Each cable module may prevent the cable above and below the cable module from coming in contact with a neighboring stationary wall. A hoist may controllably raise and lower the weight by sequentially grabbing each neighboring cable module.

The weight may be in excess of one ton.

The hoist may include one or more hooks configured to sequentially grab each neighboring cable module when controllably raising and lowering the weight. At least two of the hooks may grab two neighboring cable modules at the same time when controllably raising and lowering the weight.

Each cable module may have one or more wheels configured to reduce friction between the cable module and the neighboring stationary wall as the cable module moves respect to the neighboring stationary wall. At least one of the wheels may have a rotational axis that is angularly displaced from the rotational axis of another of the wheels and/or that is longitudinally offset from the rotational axis of another of the wheels with respect to the longitudinal axis of the cable.

The system may include a motor connected to the hoist. The motor may cause the hoist to pull on the cable causing the weight to rise, thereby converting energy that drives the motor to potential energy. A generator may capture energy generated when the weight is lowered, thereby converting at least some of the potential energy to kinetic energy. A controller may deliver energy to be stored to the motor during one time period, thereby storing the energy in the weight, and allow the weight to be lowered while driving the generator during another time period, thereby retrieving at least part of the stored energy.

The motor and the generator may be in the same or different housing and may or may not share a common shaft.

The system may include a brake configured to controllably prevent the weight from being raised or lowered.

The system may include a transmission positioned between the cable and the motor and/or the generator to modify the torque that the motor applies to the cable and/or the cable applies to the generator. The amount of torque modification provided by the transmission may be controllable.

The system may include a wellbore in which the weight is positioned. The length of the weight may be approximately half the depth of the wellbore.

The system may include a brake configured to controllably prevent the weight from being raised or lowered.

The system may include a controller. The controller may actuate the break when energy is not being transferred to or from the weight and deactivate the break when energy is being transferred to or from the weight.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
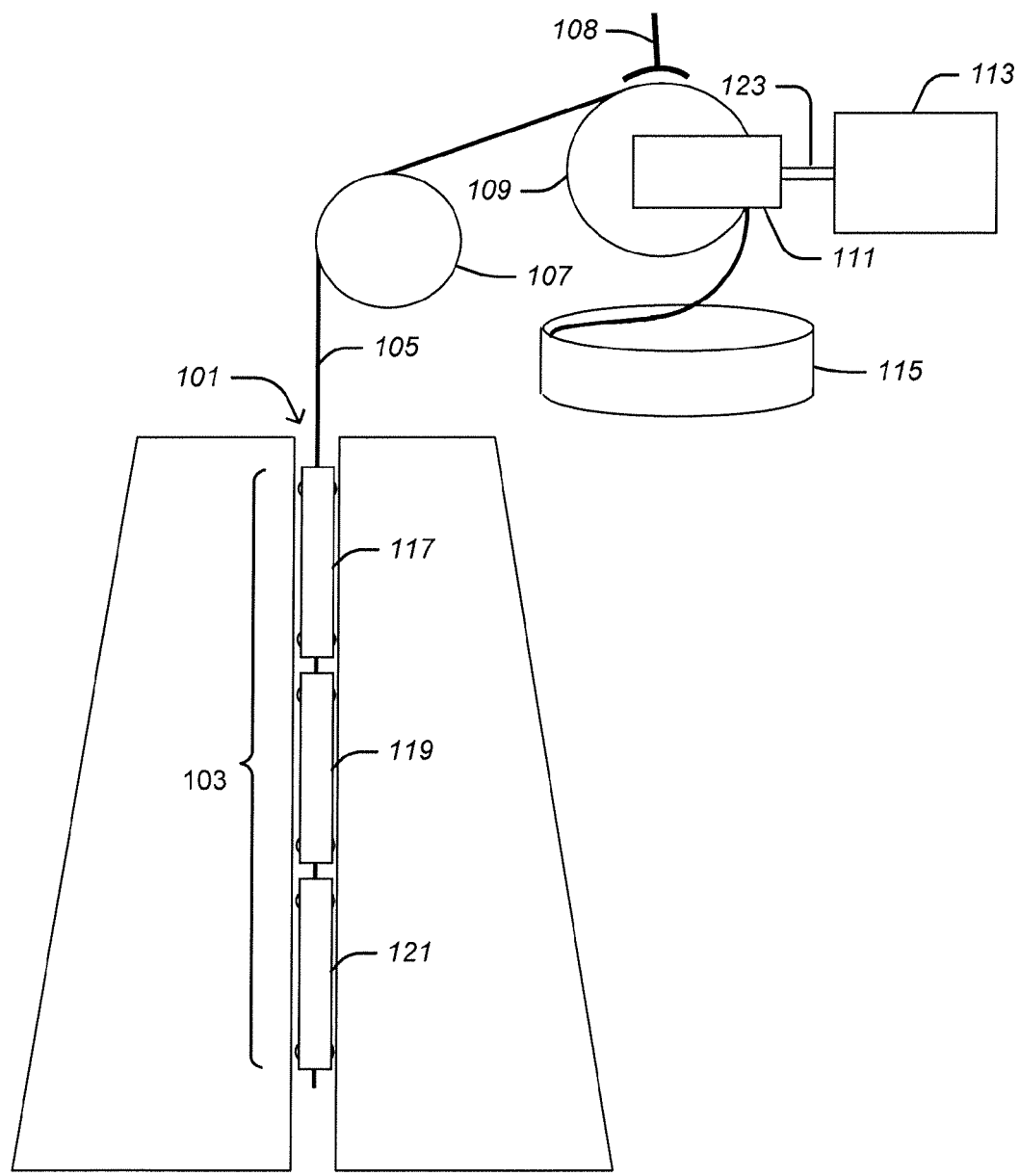
FIG. 1 illustrates an example a system for storing and retrieving energy using a multi-segment weight suspended in a wellbore.

FIG. 1 illustrates an example of a system for storing and retrieving energy using a multi-segment weight suspended in a wellbore. As illustrated in FIG. 1, the system may include a wellbore 101, a multi-segment weight 103, a cable 105, a sheave 107, a brake 108, a drum 109, a transmission 111, a motor/generator 113, and a cable coil 115.

The wellbore 101 may be one that was used for a depleted or abandoned well, or one that is being used for an operational well that is temporarily not in use. It may instead be dug just for this energy storage and retrieval application.

The depth of the wellbore 101 may vary, such as between a few hundreds of meters up to 5,000 meters. Deeper wells may enable more energy to be stored, as will now become apparent.

The multi-segment weight 103 may be connected to the cable 105. The multi-segment weight 103 may include a chain of weight segments, such as weight segments 117, 119, and 121. The number of weight segments may be greater or less. Even a single weight segment may be used. The chain of weight segments may be flexible, so as to permit each weight segment to rotate with respect to each of its neighboring weight segments. The total weight of the multi-segment weight 103 may vary, such as between 10 and 100 tons.

The cable may be made of any material. For example, the cable may be made of steel, kevlar, carbon fiber composite, or other metals or composites.

The motor in the motor/generator 113 may be configured to drive the transmission 111. In turn, the transmission 111 may be configured to drive the drum 109, pulling on the cable and thus causing the multi-segment weight 103 to rise within the wellbore 101. This may convert energy which drives the motor into potential energy in the multi-segment weight 103. Excess cable may be coiled in the cable coil 115.

The multi-segment weight 103 may be permitted to move downwardly within the wellbore 101 during an energy retrieval mode of operation. During this mode of operation, the cable 105 may rotate the drum 109 which, in turn, may drive the transmission 111 in the reverse direction. In turn, the transmission 111 may drive the generator that is part of the motor/generator 113. This may generate energy, thus returning energy stored in the multi-segment weight 103. The transmission may be a variable speed transmission or a continuously variable transmission, which contributes ease of adjustment of the generator output, particularly when adjusting it for in-phase connection to an alternating current electric grid.

As illustrated in FIG. 1, the motor and generator may be within the same housing and may share a common shaft 123. They may or may not share the same rotor and/or stator. In other configurations, the motor and the generator may be in separate housings and may or may not share a common shaft.

In some configurations, the transmission 111 may be absent. Similarly, the cable may be controlled by means which are different than the sheath 107 and the drum 109. The cable coil 115 may instead be stored on a drum 109.

The motor and generator may be configured to receive and generate, respectively, any type of energy. For example, the motor and generator may be configured to receive and generate, respectively, alternating current electrical energy, direct current electric energy, mechanical energy, pneumatic energy, fluidic energy, etc. In the case of electrical energy, for example, the motor may be an electric motor and the generator may be an electric generator.

The transmission 111 may be configured to amplify the torque that is applied by the motor when the multi-segment weight 103 is being raised and to attenuate the force that is being applied to the generator when the multi-segment weight 103 is being lowered. This amplification and attenuation may also affect the speed at which the weight is raised and lowered and the speed at which the motor and generator rotate. The degree of amplification and attenuation may be variable and subject to an external control. The degree of amplification and attenuation may be set so as to cause the motor and/or the generator to rotate at a speed that is appropriate for the circumstances, examples of which are discussed below in connection with FIGS. 14 and 15.

The brake 108 may be configured to prevent movement of the multi-segment weight 103 when actuated and to permit such movement when not actuated. Examples of when the brake might and might not be actuated are discussed below in connection with FIGS. 14 and 15.

The multi-segment weight 103 may be of any length. For example, the multi-segment weight 103 may have a length that is substantially ½ the depth of the wellbore 101. This half-depth length may maximize the amount of energy that may be stored in and retrieved from the multi-segment weight 103. Due to the flexibility provided by the segmented weight concept, other lengths for the multi-segment weight 103 may be chosen in individual instantiations, such as to accommodate a stress limit on the cable 105, or for mechanically combining multiple wellbores.

The wellbore 101 may not be straight. Rather, it may have numerous curves. Each weight segment that passes through each curve during operation of the system may have a length that is short enough to prevent the weight segment from jamming against the wall of the wellbore as the weight segment passes through the curve.

Figure 2:
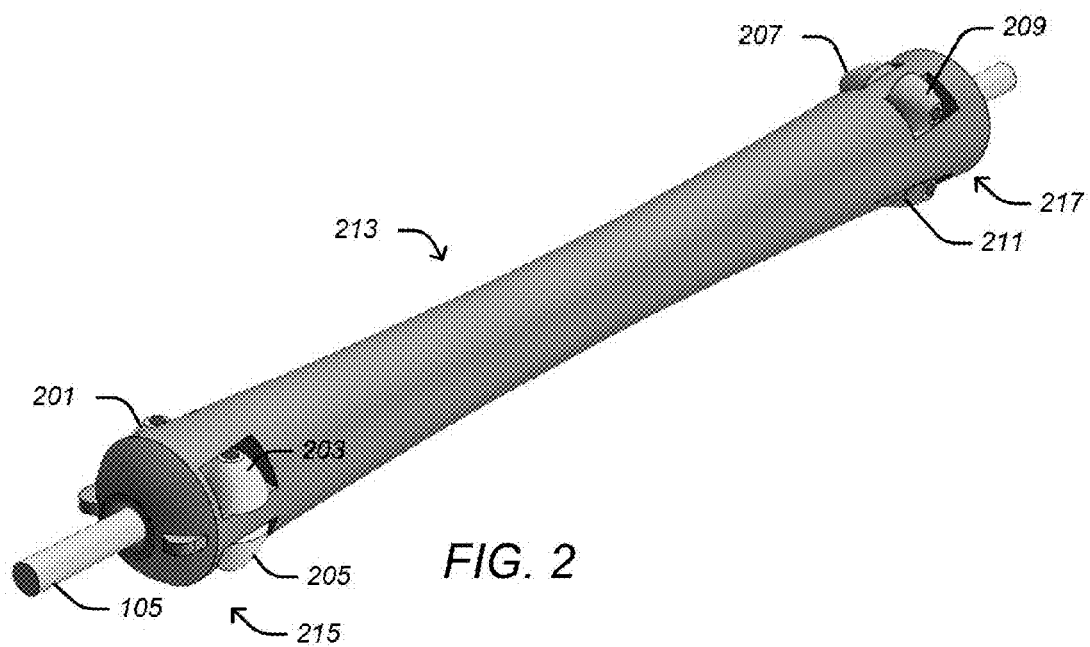
FIG. 2 illustrates an example of a weight segment that may be used in the system illustrated in FIG. 1 that incorporates friction-reducing spacer wheels.

FIG. 2 illustrates an example of a weight segment that may be used in the system illustrated in FIG. 1 that incorporates friction-reducing spacer wheels. As illustrated in FIG. 2, the weight segment may include one or more wheels, such as wheels 201, 203, 205, 207, 209, 211, and similarly structured and positioned wheels on the side of the weight segment that is not visible in FIG. 2. These wheels may be configured to reduce friction between the weight segment and the wall of the wellbore as the weight segment moves with respect to the wellbore. To facilitate this, the rotational axis of one wheel, such as the wheel 201, may be angularly displaced from the rotation access of another wheel, such as the wheel 203. Similarly, the rotational access of one wheel, such as the wheel 203, may be longitudinally offset from the rotational access of another wheel with respect to the longitudinal access of the cable 105, such as the wheel 209. In lieu of or in addition to the wheels, the exterior surface of the weight segment may be lubricated, or may be fitted with springs or sliders having the same function as the wheels, viz. to minimize friction when the weights are moving. The extreme diameter of the weight segment may be grooved, or manufactured undersize with respect to the diameter of the wellbore, in order to allow for free passage through fluids that may remain in the wellbore.

Figure 3:
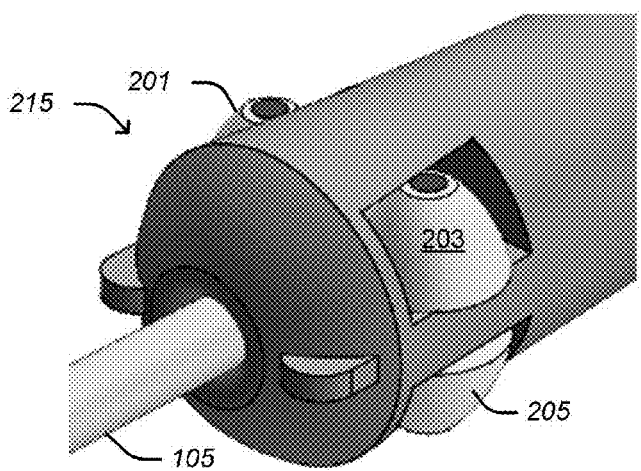
FIG. 3 illustrates an enlarged view of one end of the weight segment illustrated in FIG. 2.

FIG. 3 illustrates an enlarged view of one end 215 of the weight segment illustrated in FIG. 2.

Figure 4A:
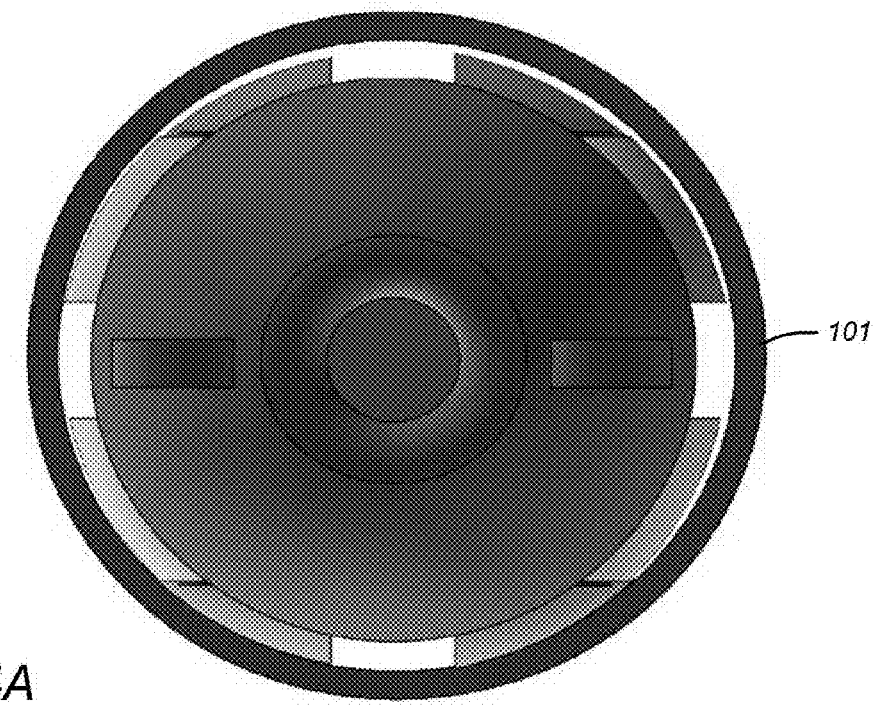
FIGS. 4A and 4B illustrate an end view of each end of the weight segment illustrated in FIG. 3.
Figure 4B:
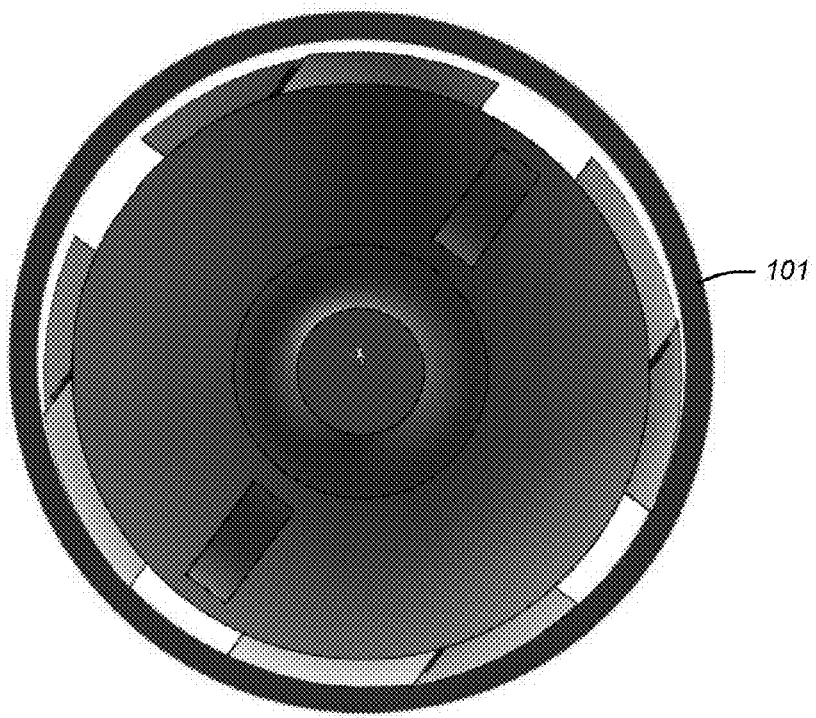

FIGS. 4A and 4B illustrate an end view of each end of the weight segment illustrated in FIG. 3. FIGS. 4A and 4B illustrate how the exterior wheel surfaces combine to create a substantially cylindrical surface that can substantially corresponds to the interior cylindrical surface of the wellbore 101.

The weight segment illustrated in FIG. 2 may have a midsection 213 with a width that is less than the width of the ends 215 and 217 of the weight segment. This may assist the weight segment in navigating through curves in the wellbore 101 without jamming.

Figure 5A:
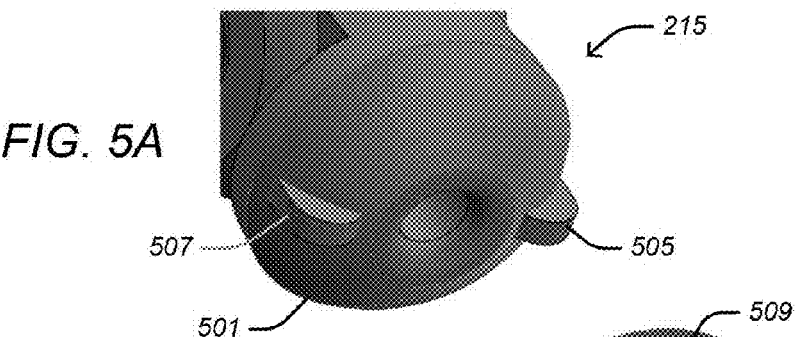
FIGS. 5A and 5B illustrate a perspective view of each end of the weight segment illustrated in FIG. 3.
Figure 5B:
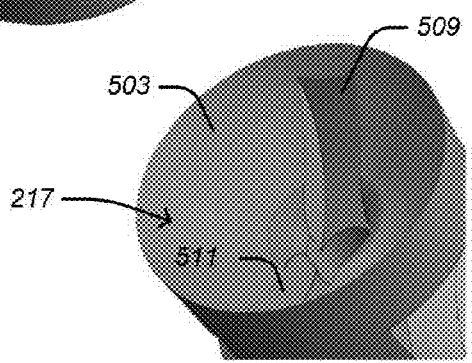

FIGS. 5A and 5B illustrate a perspective view of each end 215 and 217 of the weight segment illustrated in FIG. 2. As illustrated in FIGS. 5A and 5B, one end 215 of the weight segment may include a convex surface 501 configured to mesh with a corresponding concave surface 503 on the other end 217 of an identical weight segment. Detents 505 and 507 may be provided and configured to interlock with corresponding channels 509 and 511, respectively, when the two weight segments are stacked, thus preventing one weight segment from rotating about its longitudinal axis with respect to the other. These detents and corresponding channels may also facilitate the longitudinal axis of one weight segment rotating with respect to the longitudinal axis of the other.

Figure 6:
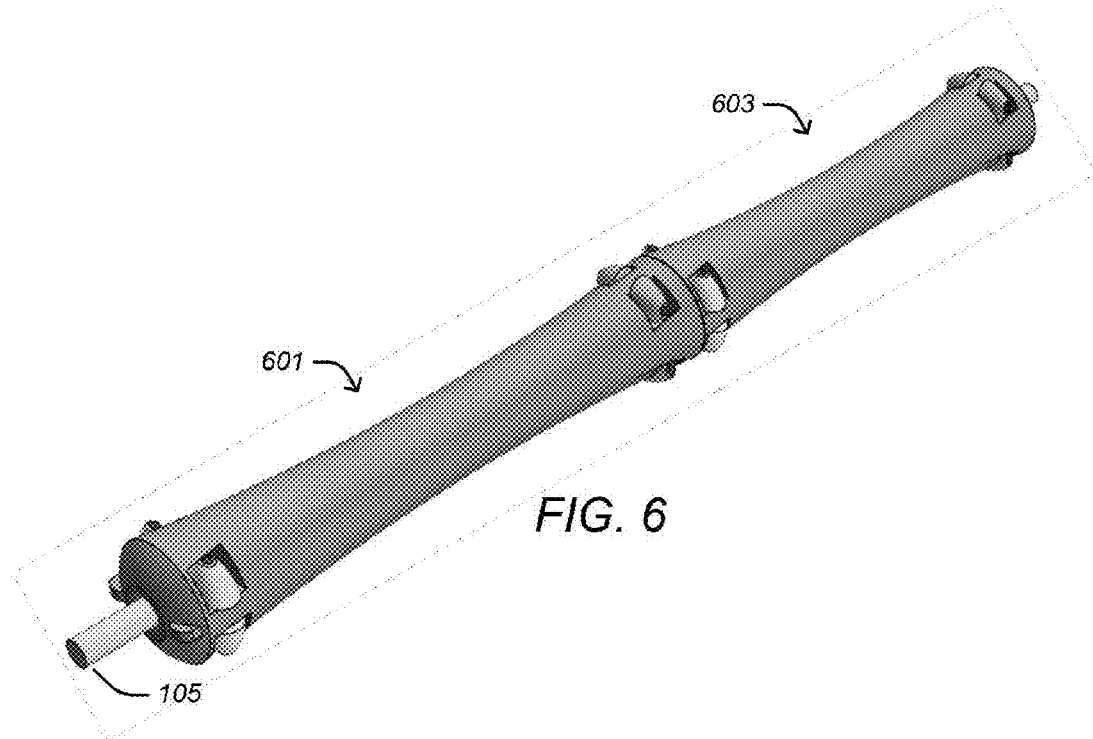
FIG. 6 illustrates an example of two of the weight segments that are illustrated in FIG. 2 stacked on a suspension cable.

FIG. 6 illustrates an example of two of the weight segments that are illustrated in FIG. 2 stacked on a suspension cable. As illustrated in FIG. 6, a first weight segment 601 has been stacked on a second weight segment 603, both of which are held by the cable 105. Although not visible in FIG. 6, the weight segments 601 and 603 may be oriented so that the convex end of one is stacked within the concave end of the other, as more particularly illustrated in FIGS. 5A and 5B. Although the longitudinal axis of both weight segments 601 and 603 are illustrated in FIG. 6 as being co-aligned, the longitudinal axis of one of the weight segments may rotate with respect to the longitudinal axis of the other, thereby causing the longitudinal axis of one to no longer to be co-aligned with the longitudinal axis of the other.

Figure 7A:
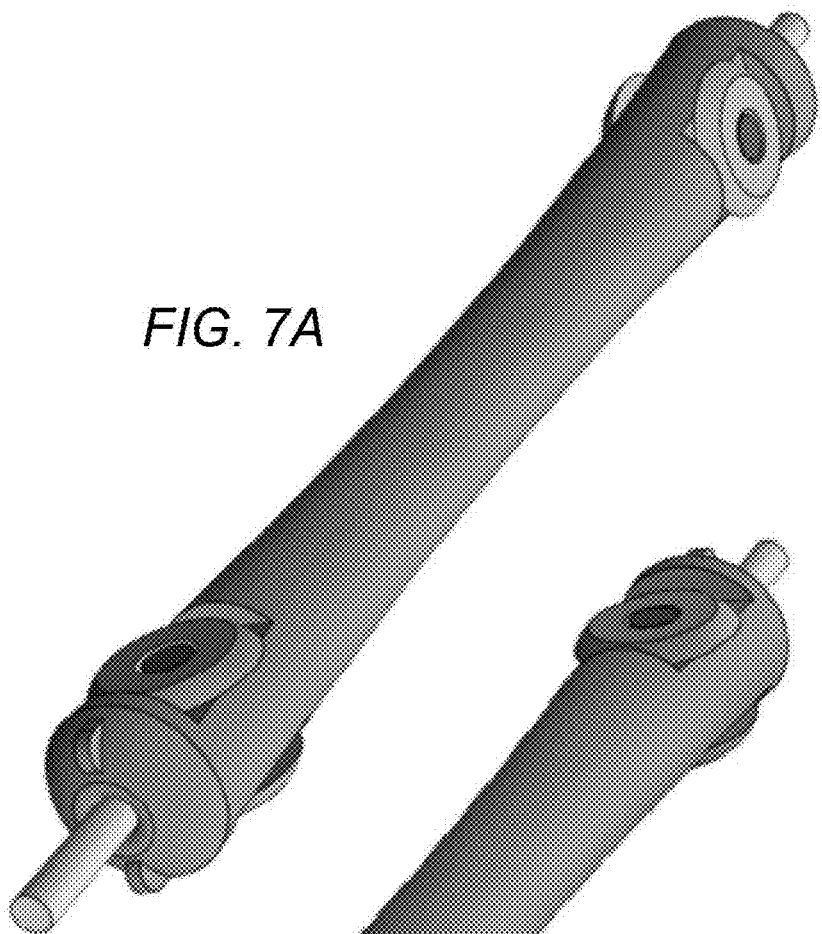
FIGS. 7A and 7B illustrate another example of a weight segment that may be used in the system illustrated in FIG. 1 that incorporates a smaller number of friction-reducing spacer wheels than is illustrated in FIG. 2.
Figure 7B:
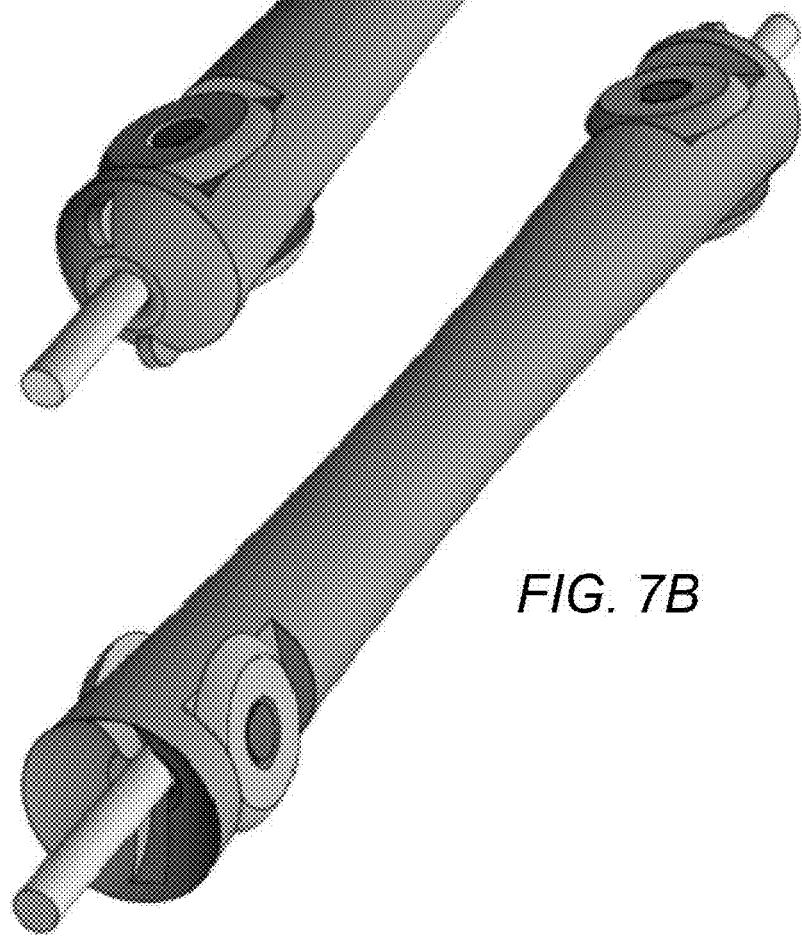

FIGS. 7A and 7B illustrate another example of a weight segment that may be used in the system illustrated in FIG. 1 that incorporates a smaller number of friction-reducing spacer wheels than is illustrated in FIG. 2.

Figures 8A, 8B:
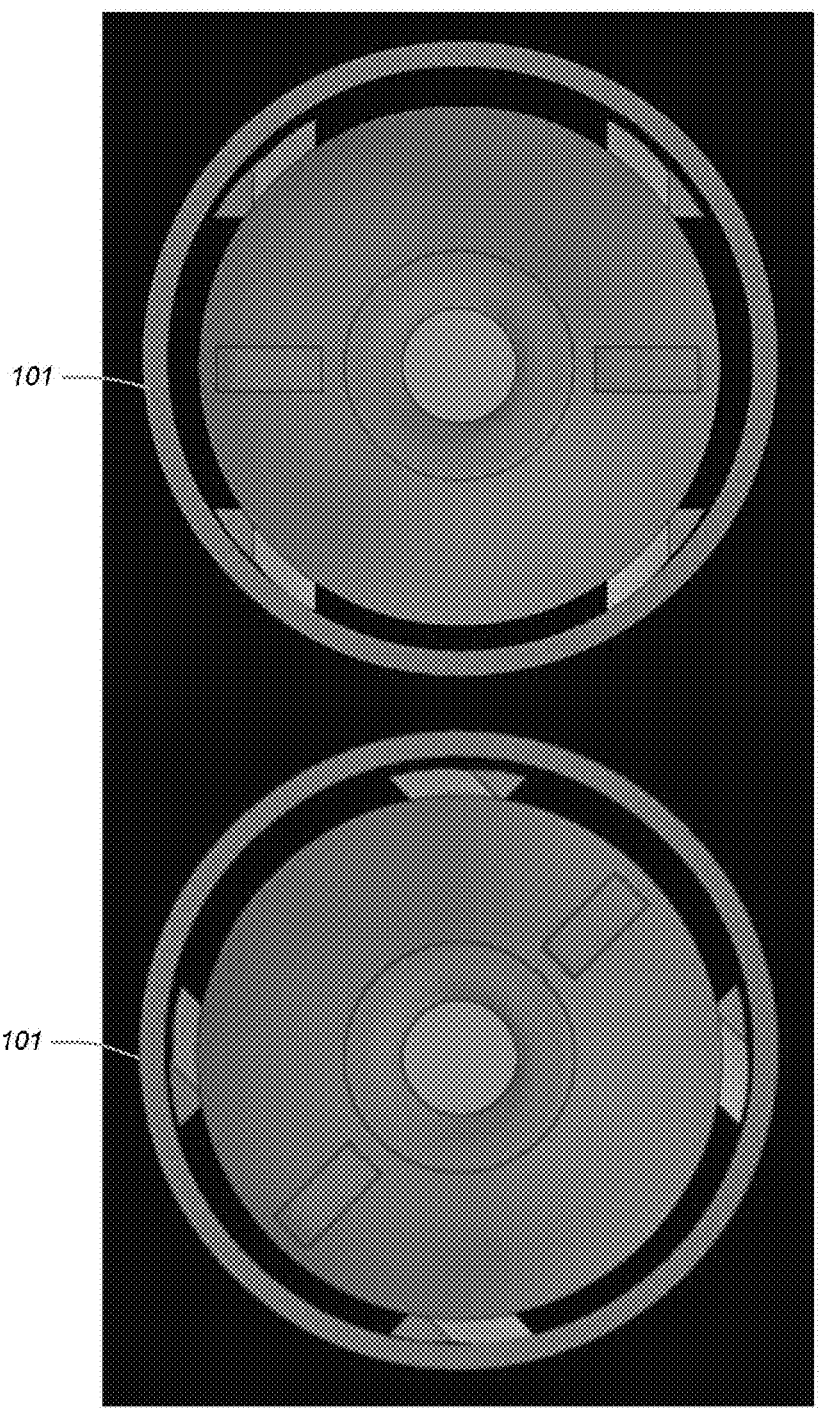
FIGS. 8A and 8B illustrate an end view of each end of the weight segment illustrated in FIGS. 7A and 7B.

FIGS. 8A and 8B illustrate an end view of each end of the weight segment illustrated in FIGS. 7A and 7B. Just like as in FIGS. 4A and 4B, the protruding surfaces of the wheels that are illustrated in FIGS. 7A and 7B may form a cylinder-like exterior, corresponding with the interior cylindrical wall of the wellbore 101. Just like in FIG. 6, the stack may be configured such that the longitudinal axis of one of the weight segments may be rotated with respect to the longitudinal axis of the other.

Figure 9:
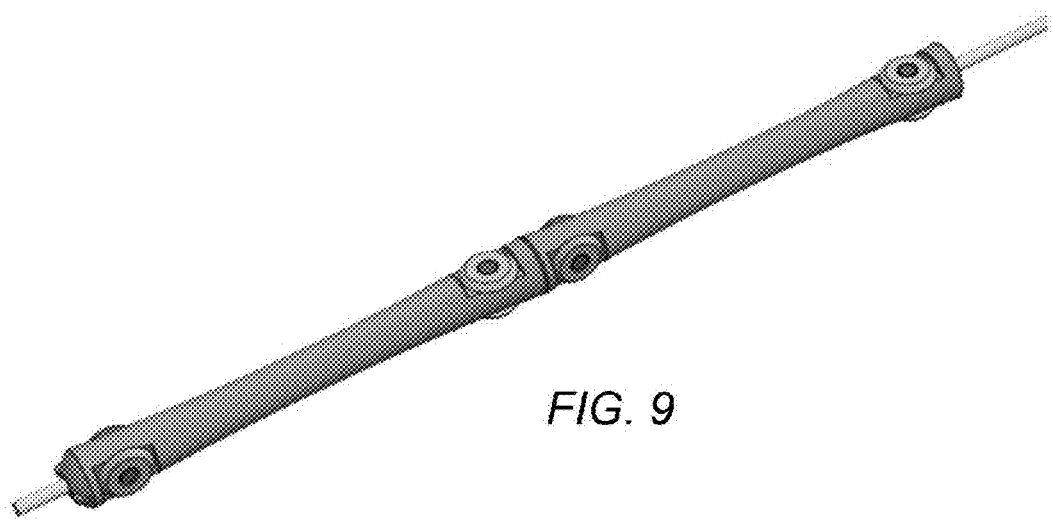
FIG. 9 illustrates an example of two of the weight segments that are illustrated in FIGS. 7A and 7B stacked on a suspension cable.

FIG. 9 illustrates an example of two of the weight segments that are illustrated in FIGS. 7A and 7B stacked on a suspension cable. Again, the weight segments may be rotates such that their longitudinal axes are no longer aligned.

Figure 10:
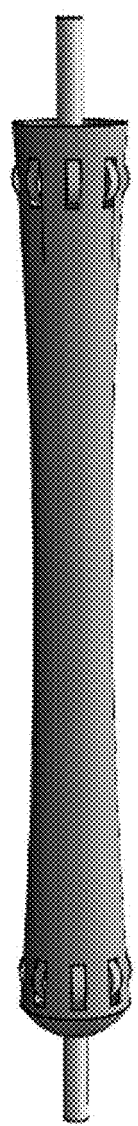
FIG. 10 illustrates another example of a weight segment that may be used in the system illustrated in FIG. 1 that incorporates a greater number of friction-reducing spacer wheels than is illustrated in FIG. 2.

FIG. 10 illustrates another example of a weight segment that may be used in the system illustrated in FIG. 1 that incorporates a greater number of friction-reducing spacer wheels than is illustrated in FIG. 2.

In a still different configuration, a still different number of wheels may be used. The wheels may also not be positioned at each end of the weight segment, as thus-far illustrated in the figures that have been discussed. Rather there may be only one set of wheels at a single location. There may instead be wheels positioned along the longitudinal axis of a weight segment at more than two locations.

Figure 11:
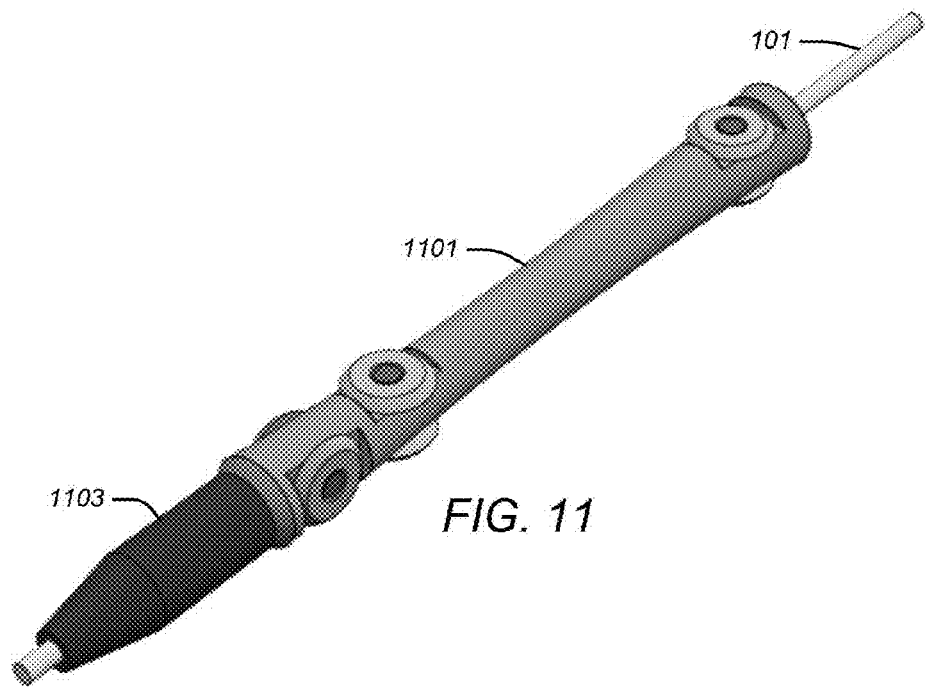
FIG. 11 illustrates an example of a cable clamp that may be used on the lower end of the cable illustrated in FIG. 1.

FIG. 11 illustrates an example of a cable clamp that may be used on the lower end of the cable illustrated in FIG. 1. As illustrated in FIG. 11, the cable 105 may be configured to slide through a central lumen in the weight segment 1101 and then be secured at its bottom end by a cable clamp 1103. Although only one weight segment is illustrated in FIG. 11, a different number may be used, such as a number that causes the length of the multi-segment weight 103 to be approximately half the height of the wellbore 101, while still permitting the multi-segment weight 103 to traverse through all of the curves of the wellbore 101 without jamming.

The cable clamp 1103 may be clamped on the lower end of the cable 105, thereby preventing each of the weight segments through which the cable 105 has been channeled from sliding off of the lower end of the cable.

In lieu of or in addition to the cable clamp 1103, each weight segment may be separately attached to the cable 105. If the weight segment is split longitudinally and the two halves are bolted together, the weight segment may clamp itself to the cable. Any attachment mechanism may be used, such as a clamp and/or set screw. Instead of or in addition to running the cable through each weight segment, each weight segment may be directly hinged to its neighboring weight segment. In this configuration, the cable 105 may only be attached to the top of the top weight segment. Even when the weight segments are attached to one another, the cable may still run through all of their centers and a clamp 1103 may be provided at the lower end thereof, enhancing the structural integrity of the entire multi-segment weight 103.

Figure 12:
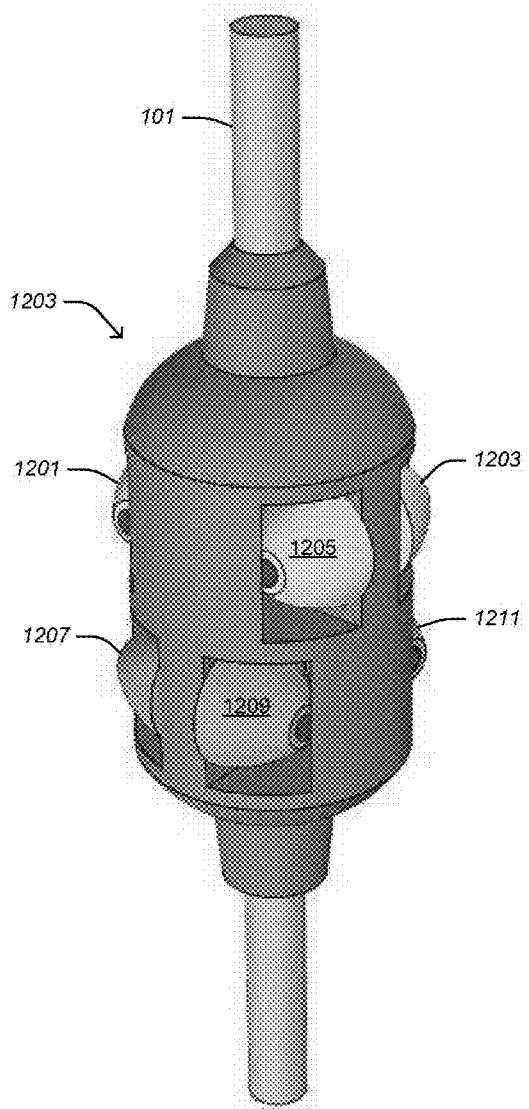
FIG. 12 illustrates an example of one of several spaced-apart cable modules that may be affixed to the cable illustrated in FIG. 1.

FIG. 12 illustrates an example of one of several spaced-apart cable modules 1203 that may be affixed to the cable 105 illustrated in FIG. 1. They may be attached to the cable 105 at spaced-apart locations above the upper end of the multi-segment weight 103. Each cable module 1203 may be configured to perform two functions.

One function that each cable module 1203 may be configured to perform is to prevent the cable above and below the cable module 1203 from coming in contact with the wall of the wellbore 101. To facilitate this, each cable module may have one or more wheels, such as wheels 1201, 1203, 1205, 1207, 1209, and 1211, and additional wheels in corresponding positions at the rear portion of the cable module 1203 that is not visible in FIG. 12. The exterior surfaces of these wheels may collectively form a cylinder just like is illustrated in FIGS. 4A and 4B in connection with similar wheels on the weight segments. As with the weight segments, moreover, at least one wheel, such as the wheel 1207, may have a rotational access that is angularly displaced from the rotation access of another of the wheels, such as the wheel 1211. Similarly, at least one of the wheels, such as the wheel 1207, may have a rotational access that is longitudinally offset from the rotational access of another of the wheels, such as the wheel 1201, with respect to the longitudinal access of the cable 105. Also as with the weight segments, a different number of wheels may be used, such as a smaller or a larger number, and the wheels may be only around a single longitudinal location or around more than two longitudinal locations.

In lieu of or in addition to the cable modules, the exterior surface of the cable may be lubricated.

A second function that the cable modules 1203 may perform is to provide periodic grab points on the cable 105 that may be sequentially grabbed by a hoist to facilitate the raising and lowering of the multi-segment weight 103.

Figures 13, 16:
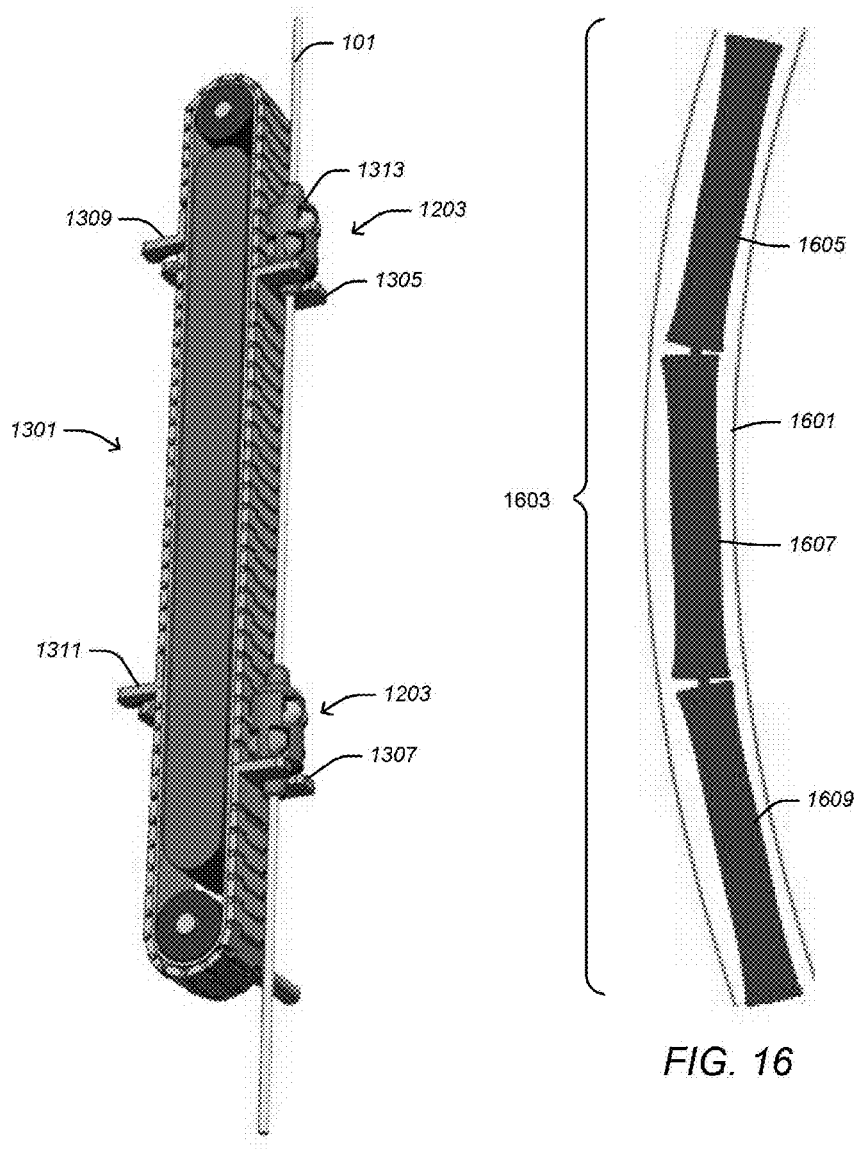
FIG. 13 illustrates a hoist that may be used to pull up on and to release the cable illustrated in FIG. 1.
FIG. 16 illustrates an example of how a multi-segment weight may look within a curved wellbore.

FIG. 13 illustrates a hoist that may be used to pull up on and to release the cable illustrated in FIG. 1. As illustrated in FIG. 13, a hoist 1301 may be configured with one or more hooks 1305, 1307, 1309, and 1311 that, during operation of the hoist, may sequentially grasp each of the cable modules 1203, thereby ensuring a non-slip and energy efficient connection between the cable 105 and the transmission 111. Although not illustrated in FIG. 1, upper and lower shafts on the hoist may be rotationally connected to the transmission 111, thereby facilitating the transfer of energy between the two.

As illustrated in FIG. 13, the hoist 1301 may be configured such that more than a single hook engages more than a single cable module at the same time, thereby distributing the lifting force that may be applied across multiple cable modules. Although two hooks are illustrated in FIG. 13 as simultaneously engaging two cable modules, the hoist 1301 may be configured such that a larger number of hooks simultaneously engage a larger number of cable modules. In a still further configuration, only a single hook may engage only a single cable module at any one time.

There may be some variation in the distance between each cable module and between each hook. Perfect alignment of each cable module and hook may therefore not be possible when multiple hooks engage multiple cable modules simultaneously, thus causing some hooks not to engage some cable modules. This condition may result in excessive force being applied to the hooks and modules that do engage. To remedy this, each hook may be spring loaded to help absorb any gap that may exist between the cable modules and the hooks.

The systems that have thus-far been described may act as an energy storage device when connected to an electrical grid. When so connected, a variety of functions may be performed. Several of these systems may be connected in parallel, either electrically or mechanically, to increase the total amount of energy that is stored and retrieved.

When used in conjunction with a variable source of power on a grid, such as a wind turbine farm or a solar photovoltaic installation, the system may store energy when the grid's production is high, and later provide power when the grid's production is low. This storage function is commonly known as output leveling. When operating in this mode, an electric utility may be able to more accurately predict the amount of power that can be retrieved from the variable source, which may increase the economic value of the source.

When used in conjunction with a large load center, such as in an urban area, the system may store energy during periods when demand and/or electricity cost are low, and later provide energy to the load center when the demand and/or cost are high. Two such storage functions are commonly known as peak shaving and voltage support. This may enable an electric utility to reduce the amount of electrical power that it needs to purchase from other sources during periods of high electricity usage or cost.

The system may be used as a source of energy in case of an emergency, such as a large-scale blackout of the grid. For this function, energy may be used to raise the weight until the desired amount of energy is stored or the upper weight travel limit is reached. The brake may then be set to maintain the height of the weight. Significantly, the amount of energy stored may not diminish over time, unlike energy that is stored in a battery or capacitor. The stored energy may later be returned by releasing the brake and connecting the generator to the grid.

The amount of power supplied by the generator to a load or to an electrical grid may be a function of the rate at which the weight descends. The generator may be a synchronous alternating current generator that may be connected to an alternating current grid. In this instance, the rotational speed of the generator shaft may need to match the frequency of the grid, for example 60 Hertz.

Any technique may be used to facilitate this synchronization. For example, the transmission 111 may be a continuously variable transmission (CVT) that is controlled by a controller to cause its transmission ratio to match what is needed for synchronization of the generated power.

The generator may instead be of the direct current type. An electrical inverter may be used to convert the direct current output of the generator into the alternating current that is needed and with the needed synchronization. Some loads may function with direct current, thus allowing a direct current generator to be used without an inverter.

Either embodiment may allow for variable rates of descent of the weight, and therefore for variable output power levels.

When a multiplicity of systems are used, the outputs of each generator may be connected in parallel to power a single large motor-generator, rather than being individually connected directly to a substation.

Another embodiment of the system may use a doubly-fed induction generator, rather than a synchronous generator. The doubly-fed induction generator may be capable of variable speed operation.

A control system may be configured to operate these various components so as to provide one or more functions. Examples of what the control system may be configured to accomplish include: storing energy by connecting the motor at appropriate times to its power source to raise the weight; retrieving energy at appropriate times by connecting the generator to the load and allowing the falling weight to drive the generator; setting the brake and electrically disconnecting both the motor and the generator when energy is not being stored or retrieved; preventing the weight from exceeding upper and lower travel limits; monitoring electrical, thermal and mechanical properties of the system to insure that the system is operating correctly and safely; and setting the brake and electrically disconnecting the motor and generator should an unsafe condition be detected.

When connected to an electrical grid, the control system may provide additional functions. For example, the control system may provide output leveling for a variable source by receiving a signal from an output sensor connected to the variable source and by controlling the storage and retrieval automatically based on the output sensor signal. Similarly, the control system may perform peak shaving or voltage support for a load center by receiving a signal from a demand sensor monitoring the power demand on the load center and by controlling the storage and retrieval automatically based on the demand sensor reading.

Figure 14:
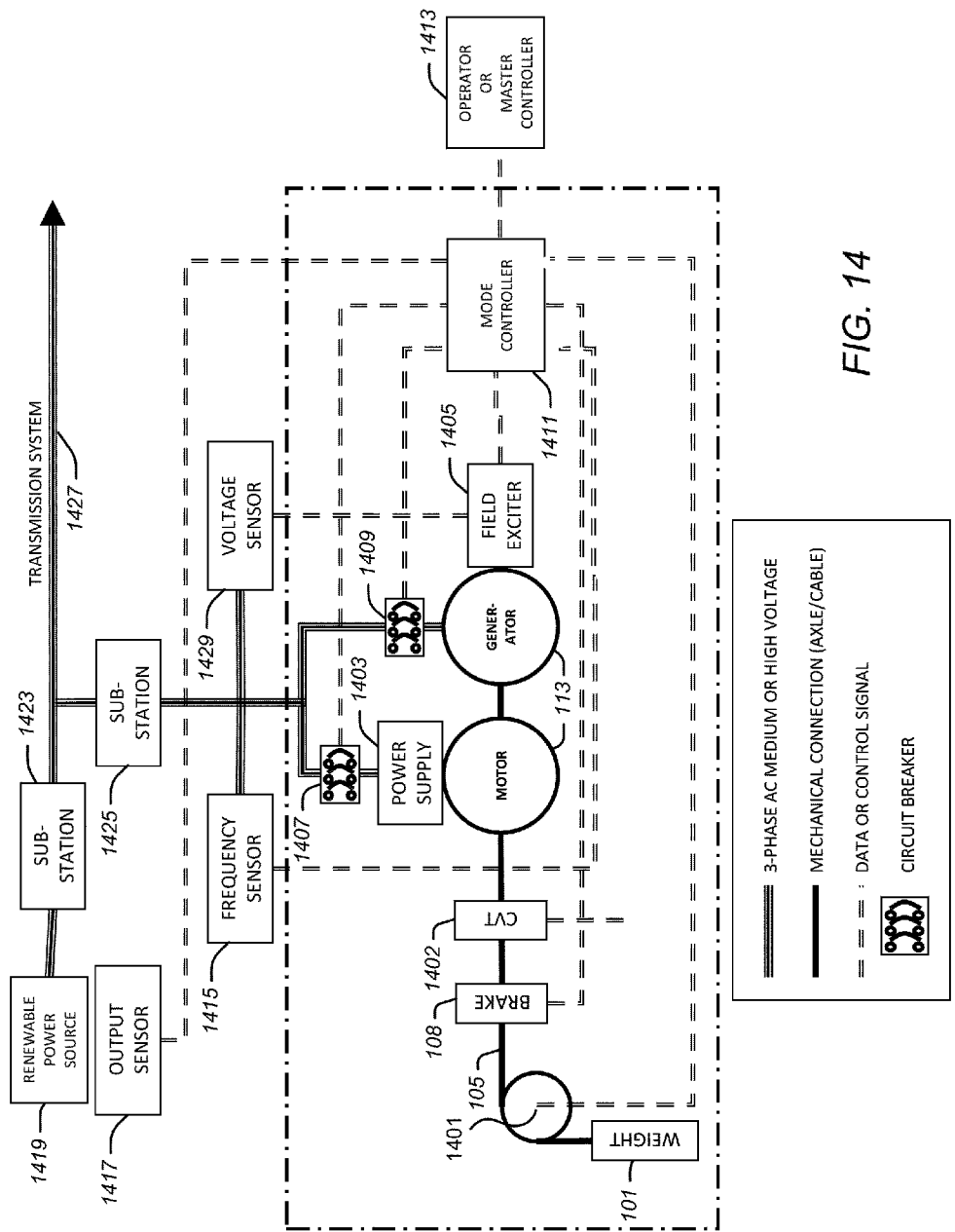
FIG. 14 illustrates an example a system for storing and retrieving energy in a wellbore that may perform output leveling for a variable source.

FIG. 14 illustrates an example of a system for storing and retrieving energy in a wellbore that may perform output leveling for a variable source. As illustrated in FIG. 14, the system may include the multi-segment weight 103, a weight position sensor 1401, the cable 105, the brake 108, the transmission 111 in the form of a continuously variable transmission 1402, the motor/generator 113, a power supply 1403 for the motor, a field exciter 1405 for the generator, a motor circuit breaker 1407, a generator circuit breaker 1409, and a mode controller 1411.

The mode controller 1411 may be configured to control the brake 108, the continuously variable transmission 1402, the motor circuit breaker 1407, the generator circuit breaker 1409, and the field exciter 1405 based on signals that it receives from the weight position sensor 1401, the operator or master controller 1413, a frequency sensor 1415, and a source output sensor 1417. The mode controller 1411 may be configured to control these components so as to cause the system to operate in one of three modes: an energy storage mode in which energy from renewable power 1419 is being directed into the system through substations 1423 and 1425; an energy retrieval mode in which energy from the system is being delivered through the substation 1425 to a transmission system 1427; or a status quo mode in which energy is not being transferred in or out of the system.

The mode controller 1411 may determine which mode to be in based on signals that it receives from the source output sensor 1417 and/or the operator or master controller 1413. For example, the operator or master controller 1413 may specify which mode the mode controller 1411 is to be, in which case the mode controller will be in that mode. At other times, the operator or master controller 1413 may direct the mode controller 1411 to select its operational mode automatically, based on what is appropriate for the circumstances.

When set to automatic, the mode controller 1411 may look to the signal it receives from the source output sensor 1417. When the signal indicates that there is excess power, the mode controller 1411 may switch to the storage mode. Conversely, when the signal indicates that additional power is needed, the mode controller 1411 may switch to the retrieval mode. When the source output sensor 1417 indicates that there is no significant excess energy or need for additional energy, the mode controller 1411 may switch to the status quo mode.

The mode of the mode controller may also be controlled by the weight position sensor 1401. When the weight is at the bottom of the well, the mode controller 1411 may be configured to remain in the status quo mode, even when the signal from the source output sensor 1417 indicates that additional energy is needed. Similarly, the mode controller 1411 may remain in the status quo mode when the weight position sensor 1401 indicates that the weight is at the top of the wellbore, even when the source output sensor 1417 indicates that there is significant excess energy.

When switching to the storage mode, the mode controller 1411 may cause the brake 108 to disengage, close the motor circuit breaker 1407, open the generator circuit breaker 1409, and deactivate the field exciter 1405. The mode controller 1411 may also set the continuously variable transmission 1402 to provide a transmission ratio that causes the motor to transfer energy to the multi-segment weight 103 at a rate that is appropriate for the amount of excess energy that is available, as reflected by the signal from the source output sensor 1417, and the capacity of the motor. Variations in any of these operational conditions may be commanded by the operator or master controller 1413, in which case such commands may override the mode of operation dictated by the source output sensor.

When switching to the retrieve mode, the mode controller 1411 may similarly deactivate the brake 108, open the motor circuit breaker 1407, close the generator circuit breaker 1409, and activate the field exciter 1405. The mode controller 1411 may also set the continuously variable transmission 1402 so that the transmission ratio causes energy to be delivered to the generator at a rate that is appropriate for the amount of energy that is needed in the transmission system 1427, as reflected by the signal from the source output sensor 1417. The mode controller 1411 may also adjust the transmission ratio in the continuously variable transmission 1402 in order to cause the phase of the signal that is generated by the generator to be synchronous with the phase of the renewable power 1419, as detected by the frequency sensor 1415. The level of the field exciter 1405 may also be governed by a signal from a voltage sensor 1429 that senses the voltage on the external system, thus ensuring that the output voltage of the generator matches. The mode controller 1411 may be configured to delay the closing of the generator circuit breaker 1409 until the continuously variable transmission 1402 and the field exciter 1405 have been correctly set.

The field exciter 1405 and the mode controller 1411 may be configured to cause the energy to be delivered smoothly and reliably, such as to provide stabilization, limiting, compensation, dampening, dead-banding, and filtering, functions that are well understood in the art.

When no transfer of energy is needed or permitted because of an override signal from the operator master controller 413, the mode controller 1411 may engage the brake 108, open the motor circuit breaker 1407, open the generator circuit breaker 1409, and deactivate the field exciter 1405. Energy that has been stored in the multi-segment weight 103 may then remain there indefinitely.

Figure 15:
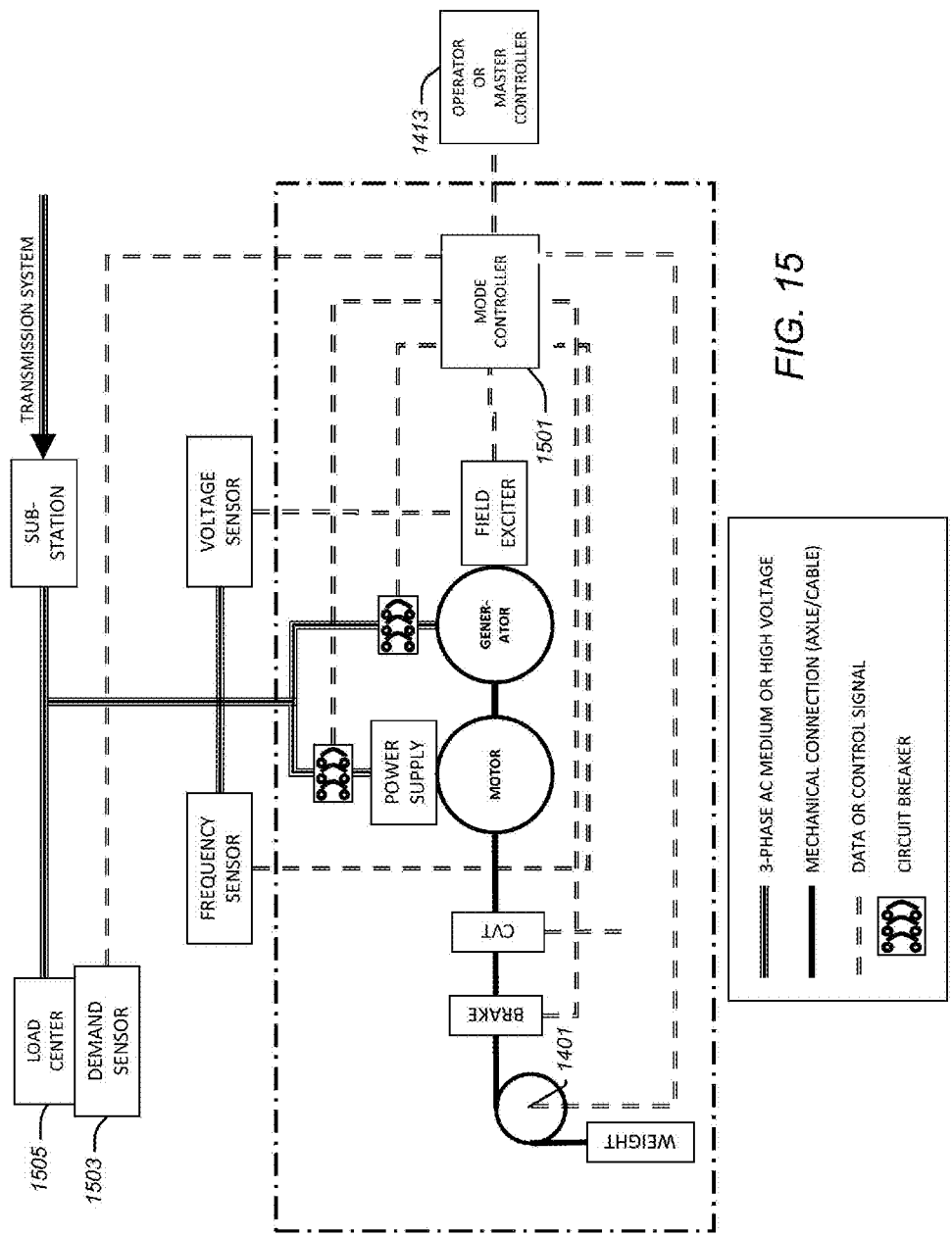
FIG. 15 illustrates an example of a system for storing and retrieving energy in a wellbore that may perform peak shaving or voltage support for a load.

FIG. 15 illustrates an example of a system for storing and retrieving energy in a wellbore that may perform peak shaving or voltage support for a load. The components illustrated in FIG. 15 may be the same as those illustrated in FIG. 14 and may perform in the same way. One exception, however, may be that the mode controller 1501 may be configured to set its mode based on the output of a demand sensor 1503 that indicates the presence of excess energy or the need for additional energy. This may not be based on the energy being generated by a renewable power, such as the renewable power source 1419. Rather, it may be based on the amount of energy usage at a load center 1505. When the amount of usage is low, the signal from the demand sensor 1503 may cause the mode controller 1501 to switch to the storage mode, subject to an override from the weight position sensor 1401 and/or the operator or master controller 1413. Similarly, when the signal from the demand sensor 1503 indicates that energy is needed, the mode controller 1411 may switch to the retrieval mode, again subject to an override from the weight position sensor 1401 and/or the operator or master controller 1413.

The amount of energy that can be stored and retrieved may depend on the weight of the multi-segment weight 103 and the height of the wellbore that it can traverse. For example, to raise a multi-segment weight of mass 100,000 kilograms a height of 3,000 meters within a wellbore requires 817 kilowatt-hours of energy, which is determined from E=mgh=2.94 billion joules of energy, the equivalent of 817 kilowatt-hours, where E=mgh is the equation for gravitational potential energy. The storage system may retrieve at least part of this energy when required.

The cost of the approaches which have been described may be competitive, on both a per-kilowatt and a per-kilowatt-hour basis, with other technologies having a minimum response time of seconds. For example, a 300 kW motor, 300 kW generator, wire cable, and a reduction gear may cost about $5,000 each in quantity, $10,000 for other materials, $10,000 for assembly labor, and $20,000 for transportation. This gives a per-system cost of $60,000. This may result in $200 per kilowatt and $73 per kilowatt-hour.

There may be an optimal length for the multi-segment weight 103. For simplicity, assume that the multi-segment weight 103 is cylindrical and that the gaps between the weight segments are negligible. Let L=Length of weight chain, D=Well depth, S=Cross section of weight assuming cylindrical shape, d=material density of multi-segment weight 103, E=stored energy, and g=gravity. Then:

$$E = L \cdot S \cdot d \cdot g (D-L)$$

Setting the derivative of E with respect to L equal to zero yields the optimal L:

$$D - 2L = 0$$

Thus, the optimal length L may be D/2. There may be occasions when the length should be less than optimal, such as when the optimal length is too heavy for one or more components in the system, such as the cable 105.

FIG. 16 illustrates an example of a multi-segment weight 1603 having weight segments 1605, 1607, and 1609 within a curved wellbore 1601.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the multi-segment weight may be replaced by a heavy cable. The mode controller 1411 may be simplified if the energy storage system is not connected to an electrical grid, but is simply part of a local system with a small number of energy sources and loads. The specific operating rules programmed into the mode controller 1411 may be varied depending upon electricity market rules and regulations, and the compensation schedule for energy storage services. Modes of operation not described heretofore, such as fast-time frequency compensation services for variable sources, may be programmed into the mode controller 1411 should such services appear advantageous to the operator. The switching of modes by the mode controller 1411 may not be automatic, but instead may be done only in response to commands received from an operator or in response to unsafe conditions.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The invention claimed is:

1. A system for storing and retrieving energy comprising:
a cable;
a weight connected to the cable;
a plurality of cable modules attached at spaced-apart locations to the cable above the weight, each cable module being configured to prevent the cable above and below the cable module from coming in contact with a neighboring stationary wall; and
a hoist configured to controllably raise and lower the weight by sequentially grabbing each neighboring cable module.

2. The system of claim 1 wherein the weight is in excess of one ton.

3. The system of claim 1 wherein the hoist includes at least one hook configured to sequentially grab each neighboring cable module when controllably raising and lowering the weight.

4. The system of claim 3 wherein the hoist includes multiple hooks, each configured to sequentially grab each neighboring cable module when controllably raising and lowering the weight.

5. The system of claim 4 wherein the hoist is configured such that at least two of the multiple hooks grab two neighboring cable modules at the same time when controllably raising and lowering the weight.

6. The system of claim 1 wherein each cable module has at least one wheel configured to reduce friction between the cable module and the neighboring stationary wall as the cable module moves with respect to the neighboring stationary wall.

7. The system of claim 6 wherein each cable module has multiple wheels configured to reduce friction between the cable module and the neighboring stationary wall as the cable module moves with respect to the neighboring stationary wall, at least one of the wheels having a rotational axis that is angularly displaced from the rotational axis of another of the wheels.

8. The system of claim 6 wherein each cable module has multiple wheels configured to reduce friction between the cable module and the neighboring stationary wall as the cable module moves with respect to the neighboring stationary wall, at least one of the wheels having a rotational axis that is longitudinally offset from the rotational axis of another of the wheels with respect to the longitudinal axis of the cable.

9. The system of claim 1 further comprising:
- a motor connected to the hoist and configured to cause the hoist to pull on the cable causing the weight to rise, thereby converting energy that drives the motor to potential energy;
- a generator configured to capture energy generated when the weight is lowered, thereby converting at least some of the potential energy to kinetic energy; and
- a controller configured to deliver energy to be stored to the motor during one time period, thereby storing the energy in the weight, and to allow the weight to be lowered while driving the generator during another time period, thereby retrieving at least part of the stored energy.

10. The system of claim 9 further comprising a brake configured to controllably prevent the weight from being raised or lowered.

11. The system of claim 9 wherein the motor and the generator are in different housings.

12. The system of claim 11 wherein the motor and the generator share a common shaft.

13. The system of claim 11 wherein the motor and the generator do not share a common shaft.

14. The system of claim 9 wherein the motor and the generator are in the same housing and share a common shaft.

15. The system of claim 9 further comprising a transmission positioned between the cable and the motor and/or the generator to modify the torque that the motor applies to the cable and/or the cable applies to the generator.

16. The system of claim 15 wherein the amount of torque modification provided by the transmission is controllable.

17. The system of claim 9 further comprising a wellbore in which the weight is positioned.

18. The system of claim 17 in which the length of the weight is approximately half the depth of the wellbore.

19. The system of claim 9 further comprising further comprising a brake configured to controllably prevent the weight from being raised or lowered.

20. The system of claim 19 wherein the controller is configured to:
- actuate the break when energy is not being transferred to or from the weight; and
- deactivate the break when energy is being transferred to or from the weight.

* * * * *

UNITED STATES PATENT AND TRADEMARK OFFICE
Certificate

Patent No. 8,618,680 B2                                                          Patented: December 31, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Behrokh Khoshnevis, Marina del Rey, CA (US); and Gordon Roesler, Marina del Rey, CA (US).

Signed and Sealed this Eighteenth Day of November 2014.

<div style="text-align:right">

TULSIDAS C. PATEL
*Supervisory Patent Examiner*
Art Unit 2831
Technology Center 2800

</div>